(12) United States Patent
Yamada et al.

(10) Patent No.: US 10,279,666 B2
(45) Date of Patent: May 7, 2019

(54) AUTOMOBILE BELTLINE PORTION SOUND INSULATING STRUCTURE AND AUTOMOBILE DOOR GLASS

(71) Applicant: Asahi Glass Company, Limited, Chiyoda-ku (JP)

(72) Inventors: Daisuke Yamada, Chiyoda-ku (JP); Shunsuke Sadakane, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 15/223,528

(22) Filed: Jul. 29, 2016

(65) Prior Publication Data

US 2017/0028831 A1 Feb. 2, 2017

(30) Foreign Application Priority Data

Jul. 31, 2015 (JP) ................................. 2015-151865
Jun. 3, 2016 (JP) ................................. 2016-111692

(51) Int. Cl.
*B60J 10/50* (2016.01)
*B60J 1/08* (2006.01)
(Continued)

(52) U.S. Cl.
CPC ................. *B60J 10/50* (2016.02); *B60J 1/08* (2013.01); *B60J 1/2097* (2013.01); *B60J 10/235* (2016.02); *B60J 10/32* (2016.02); *B60J 10/75* (2016.02)

(58) Field of Classification Search
CPC ..... B60J 1/17; B60J 10/50; B60J 10/75; B60J 1/2097
See application file for complete search history.

(56) References Cited

U.S. PATENT DOCUMENTS 1,939,976 A * 12/1933 Graebner .............. E05F 11/382
49/227
1,954,268 A * 4/1934 Simpson .................. B60J 10/75
49/377
(Continued)

FOREIGN PATENT DOCUMENTS

CN 1671572 A 9/2005
DE 10 2009 020 351 A1 11/2010
(Continued)

OTHER PUBLICATIONS

Extended European Search Report dated Jan. 31, 2017 in Patent Application No. 16001667.1.
(Continued)

*Primary Examiner* — Catherine A Kelly
(74) *Attorney, Agent, or Firm* — Oblon, McClelland, Maier & Neustadt, L.L.P.

(57) ABSTRACT

An automobile beltline portion sound insulating structure formed along a beltline of an automobile, a door panel having two panel boards facing each other, a door glass being freely openable and closable by being provided between the two panel boards in a liftable manner and a first viscoelastic member mounted on a lower portion of at least one main surface of the door glass, the first viscoelastic member constrained by a mounting region of the first viscoelastic member in the door glass and a part of a surface of the panel board facing to the one main surface, at a door glass closed time, to insulate sound between the door panel and the door glass.

14 Claims, 4 Drawing Sheets

(51) Int. Cl.
  *B60J 10/235* (2016.01)
  *B60J 10/32* (2016.01)
  *B60J 10/75* (2016.01)
  *B60J 1/20* (2006.01)

(56) References Cited

U.S. PATENT DOCUMENTS

| | | | | |
|---|---|---|---|---|
| 1,991,017 A * | 2/1935 | Hickman | | E05F 11/382 |
| | | | | 49/350 |
| 2,069,219 A * | 2/1937 | Conlon | | B60J 1/17 |
| | | | | 49/377 |
| 2,184,553 A * | 12/1939 | Johnson | | B60J 10/75 |
| | | | | 49/377 |
| 4,291,076 A * | 9/1981 | Katoh | | B60R 13/07 |
| | | | | 293/126 |
| 4,949,509 A * | 8/1990 | Gold | | B60S 1/54 |
| | | | | 428/122 |
| 5,489,461 A * | 2/1996 | Iwasa | | B32B 25/08 |
| | | | | 428/122 |
| 5,791,088 A * | 8/1998 | Martinelli | | B60J 1/16 |
| | | | | 49/375 |
| 6,115,967 A * | 9/2000 | Warnecke | | B60J 10/15 |
| | | | | 49/374 |
| 6,668,489 B2 * | 12/2003 | Baba | | B60J 10/24 |
| | | | | 49/498.1 |
| 7,344,772 B2 * | 3/2008 | Rehfeld | | B32B 17/10036 |
| | | | | 428/304.4 |
| 7,669,910 B2 * | 3/2010 | Charlier | | B32B 17/10036 |
| | | | | 296/93 |
| 8,091,956 B2 * | 1/2012 | Oerke | | B60J 10/24 |
| | | | | 296/216.06 |
| 2005/0095397 A1 * | 5/2005 | Omori | | B32B 27/08 |
| | | | | 428/122 |
| 2006/0254149 A1 * | 11/2006 | Kanbara | | B60J 10/24 |
| | | | | 49/377 |
| 2010/0011671 A1 * | 1/2010 | Gentemann | | B60J 10/75 |
| | | | | 49/489.1 |
| 2010/0206663 A1 * | 8/2010 | Payot | | B60J 1/17 |
| | | | | 181/208 |
| 2017/0028830 A1 * | 2/2017 | Yamada | | B60J 10/50 |

FOREIGN PATENT DOCUMENTS

| | | |
|---|---|---|
| EP | 0 694 429 A1 | 1/1996 |
| EP | 0 822 109 A1 | 2/1998 |
| JP | 7-276985 A | 10/1995 |
| JP | 10-119582 A | 5/1998 |
| JP | 2001-219738 | 8/2001 |

OTHER PUBLICATIONS

Chinese Office Action dated May 22, 2018 issued in Chinese Application No. 201610613278.5 with English translation (15 pp.).

* cited by examiner

AUTOMOBILE BELTLINE PORTION SOUND INSULATING STRUCTURE AND AUTOMOBILE DOOR GLASS

CROSS REFERENCE TO RELATED APPLICATION

This application is based upon and claims the benefit of priority from Japanese Patent Applications Nos. 2015-151865 filed on Jul. 31, 2015, and 2016-111692 filed on Jun. 3, 2016; the entire contents of which are incorporated herein by reference.

FIELD

Embodiments described herein relate generally to an automobile beltline portion sound insulating structure and an automobile door glass used for the sound insulating structure.

BACKGROUND

As one of methods to enhance a sound insulating property of a automobile interior of an automobile, there has been conventionally adopted a method of providing a sound insulating structure along a beltline of the automobile. As such a sound insulating structure, for example, Reference 1 (JP-A 2001-219738) discloses a sound insulating structure in which, at a door glass closed time, sound insulators are provided in ones of lower end portions of an outer seal portion and an inner seal portion which are mounted on a door panel, and portions corresponding to the lower end portions of the door glass, and projections elastically contacting the sound insulators are provided in the other of the above.

The sound insulating structure described in Reference 1 intends to prevent intrusion of sound from a automobile exterior by closing a gap in the door panel, concretely, between the seal portion provided in the door panel and the door glass, at the door glass closed time, and a reasonable sound insulating effect can be obtained. However, noise of a automobile interior of an automobile includes, in addition to sound intruding by air propagation from the automobile exterior, sound generated as a result that various members including a door glass vibrate. A sound insulating property of the automobile interior is expected to be improved by suppressing vibration of the door glass in particular, but in the sound insulating structure of Reference 1, a countermeasure against vibration of the door glass is not considered and a high-level sound insulating performance cannot be obtained.

SUMMARY

The present invention is made in view of the above, and its object is to provide an automobile beltline portion sound insulating structure capable of improving a sound insulation state of an automobile interior at a door glass closed time to a high level by suppressing intrusion of sound from a automobile exterior via a beltline portion and occurrence of sound due to vibration of the door glass itself, and an automobile door glass used for that sound insulating structure.

An automobile beltline portion sound insulating structure of the present invention is a sound insulating structure formed along a beltline of an automobile, comprising: a door panel having two panel boards facing each other, a door glass being freely openable and closable by being provided between the two panel boards in a liftable manner and a first viscoelastic member mounted on a lower portion of at least one main surface of the door glass, the first viscoelastic member constrained by a mounting region of the first viscoelastic member in the door glass and a part of a surface of the panel board facing the one main surface, at a door glass closed time, to insulate sound between a door panel and a door glass.

An automobile door glass of the present invention is used for the beltline portion sound insulating structure of the present invention, the automobile door glass being made of a glass plate on which the viscoelastic member is mounted.

An automobile beltline portion sound insulating structure of the present invention has a high sound insulating performance, that is, suppressing an amount of sound intruding from a automobile exterior via a beltline portion and suppressing occurrence of sound due to vibration of a door glass itself. Thereby, by using the automobile beltline portion sound insulating structure of the present invention, a high-level sound insulation state can be achieved in an automobile interior at a door glass closed time. An automobile door glass of the present invention, when mounted on an automobile, can constitute the automobile beltline portion sound insulating structure of the present invention which can achieve the high-level sound insulation state in the automobile interior at the door glass closed time.

DETAILED DESCRIPTION

Hereinafter, embodiments of a beltline portion sound insulating structure (hereinafter, also referred to simply as a "sound insulating structure") and an automobile door glass (hereinafter, also referred to simply as a "door glass") of the present invention will be described with reference to the drawings. Note that the present invention is not limited to these embodiments and these embodiments can be altered or modified without departing from the spirit and the scope of the present invention.

Figure 1:
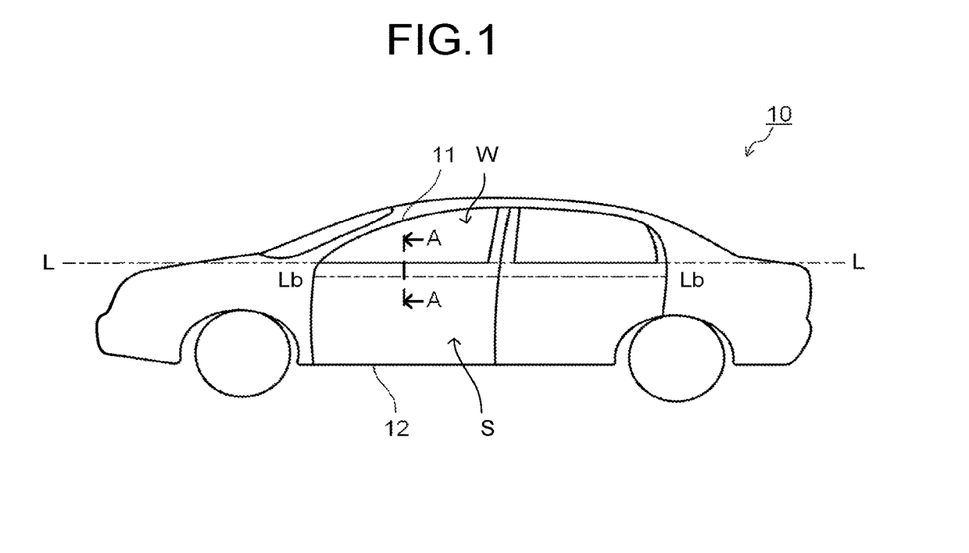
FIG. 1 is a side view of an automobile having a beltline portion sound insulating structure of the present invention.
Figure 2:
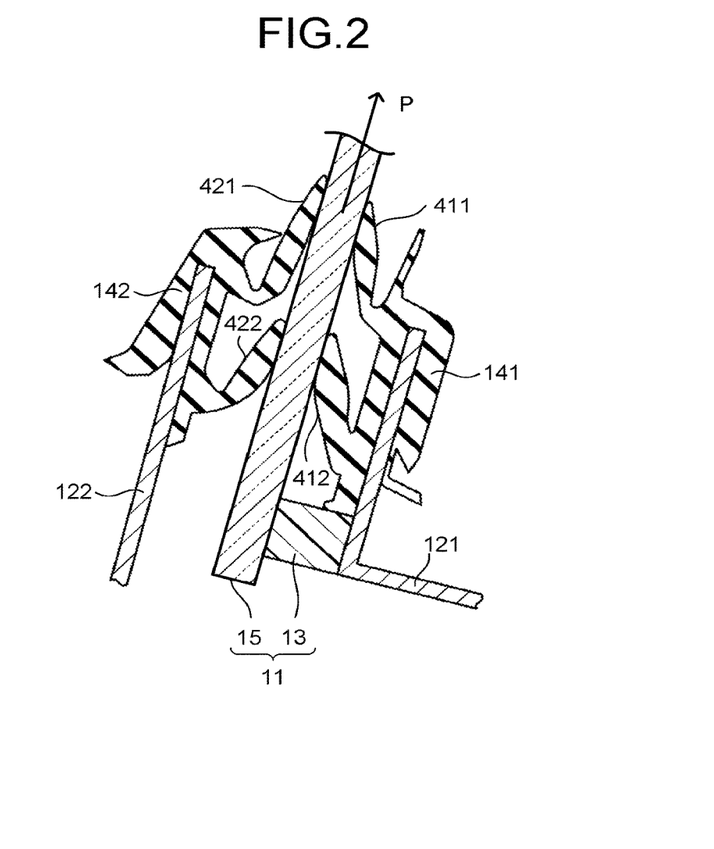
FIG. 2 is an A-A line cross-sectional view of FIG. 1 which schematically shows a state at a door glass closed time in an example of the beltline portion sound insulating structure of the present invention.

FIG. 1 is a side view of an automobile which shows a position of an automobile beltline portion in which a sound insulating structure of the present invention shown in FIG. 2 is provided. FIG. 2 is a diagram schematically showing a state at a door glass closed time in an example of the beltline portion sound insulating structure of the present invention, and is an A-A line cross-sectional view of FIG. 1.

The sound insulating structure of the present embodiment is provided in the beltline portion being an example of the embodiment shown in FIG. 1. In the automobile 10 shown in FIG. 1, front and rear side doors S are each constituted by a door panel 12 and a door glass 11 which is provided in the door panel 12 in a liftable manner, and FIG. 1 shows the automobile 10 in a state where the door glass 11 is closed.

The door panel 12 has two panel boards (not shown) facing each other, and the door glass 11 is freely openable and closable by being provided between the two panel boards in the liftable manner. The door glass 11 being freely openable and closable means that a window opening portion W positioned in an upside of the side door S is free to be opened and closed by the door glass 11 being raised and lowered. In other words, at a door glass 11 closed time, the window opening portion W is closed by the door glass 11, and at the door glass 11 opened time, the widow opening portion W is in a state of being opened. In the present specification, among the two panel boards which the door panel 12 has, the panel board positioned on a automobile interior side is referred to as an inner panel and the panel board positioned on a automobile exterior side is referred to as an outer panel.

In the automobile 10, a beltline L is a line connecting upper ends of the front and rear door panels 12. In the present invention, a region having a predetermined width from the upper ends of the door panels 12 toward a downside along the beltline L is referred to as a beltline portion. In FIG. 1, a lower end of this width is indicated as Lb. In other words, the beltline portion indicates a region sandwiched by the beltline L and the lower end Lb of the width. The side door S of the automobile 10 has a configuration which enables a structure for sound insulation in the belt line portion at the door glass 11 closed time.

The sound insulating structure of the beltline portion shown in FIG. 2 will be described. The door panel 12 has the inner panel 121 and the outer panel 122 as the two panel boards facing each other, and the door glass 11 is provided between the inner panel 121 and the outer panel 122 in the liftable manner. The inner panel 121 and the outer panel 122 have, in the belt line portions being regions along the beltline of facing surfaces, an inner seal portion 141 and an outer seal portion 142, respectively, which seal between the inner panel 121 and the outer panel 122, and the door glass 11.

The inner seal portion 141 has two lip portions vertically on a door glass 11 side, that is, an upper inner lip 411 and a lower inner lip 412, while the outer seal portion 142 similarly has an upper outer lip 421 and a lower outer lip 422 on a door glass 11 side. The inner seal portion 141 and the outer seal portion 142 are formed of a synthetic rubber such as an ethylene propylene rubber (EPDM rubber), a thermoplastic elastomer such as a polyolefin based elastomer, or the like. Note that an arrow P in FIG. 2 indicates a traveling direction of the door glass 11 at a time that the door glass 11 is closed.

[Sound Insulating Structure]

The door glass 11 has a door glass main body 15 and a first viscoelastic member 13 (viscoelastic member), as its cross-sectional view is shown in FIG. 2. The first viscoelastic member 13 is mounted on a lower portion of a main surface on a automobile interior side of the door glass main body 15. As shown in FIG. 2, at the door glass 11 closed time, the first viscoelastic member 13 is constrained by a mounting region of the first viscoelastic member 13 in the door glass 11 and a part of a surface on the door glass 11 side of the inner panel 121. The lower portion of the door glass 11 is a region in which the first viscoelastic member 13 can be constrained by the door glass 11 and the part of the surface on the door glass 11 side of the inner panel 121 at the door glass 11 closed time.

According to the sound insulating structure shown in FIG. 2, the first viscoelastic member 13 is sandwiched between the door glass 11 and the inner panel 121 and firmly contacts the door glass 11 and the inner panel 121, enabling sealing of a automobile interior. Thus, it is possible to sufficiently suppress an amount of sound intruding into the automobile interior via the beltline portion at the door glass closed time. Further, as a result that the first viscoelastic member 13 is constrained between the door glass 11 and the inner panel 121, a constraining type vibration suppressing structure is formed. Here, "constraining" means a state where the first viscoelastic member 13 is sandwiched between the door glass 11 and the inner panel 121 and movement of the first viscoelastic member 13 is restricted. Thereby, vibration of the door glass main body 15 is sufficiently suppressed, and a high sound insulating effect in the automobile interior at the door glass closed time can be realized. Note that as a cause of vibration of the door glass, there can be cited propagation of road noise from a door panel to a door glass, propagation of engine noise, and so on. According to the beltline portion sound insulating structure of the present invention, vibration of the door glass due to either cause is able to be suppressed sufficiently.

(Physical Property of First Viscoelastic Member 13)

The first viscoelastic member 13 is made of a viscoelastic body, and has a sound insulating property and a vibration suppressing property. In the viscoelastic member 13, it is preferable that a Young's modulus E (N/m$^2$) at 20° C. and a loss coefficient tan δ at 20° C. and at 4000 Hz in frequency satisfy the following formula (1). Hereinafter, the Young's modulus indicates a value at 20° C. and the loss coefficient indicates a value at 20° C. and at 4000 Hz in frequency as long as not particularly stated.

[Formula 1]

$$E \geq 2.64 \times 10^2 \frac{1 + \tan^2 \delta}{\tan \delta} \tag{1}$$

In the above, the Young's modulus E is an index to measure a hardness of the first viscoelastic member 13, and the loss coefficient tan δ is an index to measure a viscosity of the first viscoelastic member 13. As a result that the Young's modulus E and the loss coefficient tan δ are in ranges satisfying the above formula (1), the viscoelastic member 13 exhibits a sound intrusion preventing effect and a vibration suppression effect to the door glass 11 in good balance, and comes to have an excellent sound insulating effect.

In the viscoelastic member 13, it is more preferable that the above-described loss coefficient tan δ satisfies the following formula (2).

[Formula 2]

$$E \geq 1.65 \times 10^5 \frac{1 + \tan^2 \delta}{\tan \delta} \tag{2}$$

As the viscoelastic member 13 satisfying relations of the above-described formulas (1) and (2), for example, MTS-20 (brand name) manufactured by HAYAKAWA RUBBER CO., LTD. can be cited, but the viscoelastic member 13 is not limited thereto.

As a material (hereinafter, also referred to as a "viscoelastic material") having a viscoelasticity which forms the viscoelastic member 13, there can be used, concretely, a synthetic rubber such as an EPDM rubber, a thermoplastic elastomer resin such as a polyolefin based elastomer, a polyurethane resin, a polyvinyl chloride resin, an epoxy resin, a silicone gel, a polynorbornene, or the like.

Further, the first viscoelastic member 13 may be constituted by a foam. In a case where the first viscoelastic member 13 is constituted by the foam, the first viscoelastic member 13 can be formed by foaming the above-described viscoelastic material by a conventional means. Thereby, the Young's modulus or the loss coefficient of the first viscoelastic member 13 can be adjusted at a desired value.

Further, the viscoelastic material constituting the first viscoelastic member 13 may contain a filler such as an organic filler, a mineral filler or the like. As the organic filler, there is used, for example, a resin particle formed of a resin such as a cross-linked polyester, a polystyrene, a styrene acrylic copolymer resin or a urea resin, a synthetic fiber, or a natural fiber. As the mineral filler, there is used, for example, a calcium carbonate, a calcium oxide, a magnesium hydroxide, a magnesium oxide, a magnesium carbonate, an aluminum hydroxide, a barium sulfate, a barium oxide, a titanium oxide, an iron oxide, a zinc oxide, a zinc carbonate, a clay such as a pyrophylite clay, a kaolin clay or a baked clay, mica, diatomaceous earth, carbon black, a silica, a glass fiber, a carbon fiber, a fiber filler, a nonorganic filler such as glass balloon, or the like. As described above, as a result that the filler is contained, the Young's modulus or the loss coefficient of the first viscoelastic member 13 can be adjusted at the desired value.

(Structure of Viscoelastic Member)

The first viscoelastic member 13 has a single-layer structure made of a single layer or a laminated structure made of a plurality of layers. In a case of the single-layer structure, it suffices that the first viscoelastic member 13 is formed only of the above-described viscoelastic material. In a case of the laminated structure, the first viscoelastic member 13 is laminated, for example, in a direction from a door glass side to a automobile interior side. In the case where the first viscoelastic member 13 has the laminated structure, it suffices that a relation between a Young's modulus and a loss coefficient of the laminated structure as a whole satisfies the above-described formula (1). In the case of the laminated structure, the first viscoelastic member 13 can be constituted by a laminated structure of two layers which has, on at least one surface of a soft layer formed of a viscoelastic material, the other layer other than the soft layer, or a laminated structure of three or more layers which has, on both surfaces of a soft layer, the other layers described above.

In the case of constituting the first viscoelastic member 13 by the laminated structure of three layers or more, it is possible to make the other layer described above being a most front layer (layer in contact with the door glass 11 or the inner panel 121) have an adhesiveness to the door glass 11 or the inner panel 121. Thereby, since the adhesiveness between the first viscoelastic member 13 and the door glass 11 or the inner panel 121 can be increased, it is possible to prevent intrusion of sound from a gap. Further, since a more stable constraining type vibration suppressing structure can be formed, it is possible to improve a sound insulating effect.

As a material to constitute such a most front layer, it is preferable to use a foil of aluminum, stainless steel or steel plate steel, a heat-resistant rigid resin thin sheet, or the like. Further, as a viscoelastic material constituting the soft layer, there is preferably used a synthetic rubber such as an EPDM rubber, a thermoplastic elastomer resin such as a polyolefin based elastomer, a polyurethane resin, a polyvinyl chloride resin, an epoxy resin, a silicone gel, a polynorbornene, or the like.

The first viscoelastic member 13 constituted by such a laminated structure is formed, for example, by laminating and bonding two or more kinds of layers singly formed of the above-described materials respectively.

(Shape of Viscoelastic Member)

A shape of the viscoelastic member 13 is not particularly limited as long as the shape enables the first viscoelastic member 13 to be constrained between the door glass 11 and the inner panel 121 at the door glass 11 closed time. The first viscoelastic member 13 is preferable to be elastically transformable to a moderate degree. If the first viscoelastic member 13 is elastically transformable, in a process where the first viscoelastic member 13 is inserted into and constrained between the door glass 11 and the inner panel 121 at a time that the door glass 11 is closed from the door glass 11 opened time, the first viscoelastic member 13 is elastically transformed in a manner that its thickness is gradually decreased from a front side to the rear in its traveling direction. Consequently, the thickness of the first viscoelastic member 13 is decreased at the door glass 11 closed time compared with the door glass opened time. Thereby, it is possible to close the gap between the door glass 11 and the inner panel 121 at the door glass 11 closed time more firmly thereby sealing the automobile interior, and to form a more stable constraining type vibration suppressing structure. Thus, the sound insulating effect by the first viscoelastic member 13 is improved.

In the first viscoelastic member 13, a cross-sectional shape in a vertical cross section in a direction from the door glass 11 side to the automobile interior side is preferable to be a tapered shape that tapers toward its upper end, that is, in the traveling direction of the door glass 11 at the time that the door glass 11 is closed. By the above, when the door glass 11 is closed from the door glass 11 opened time, the first viscoelastic member 13 becomes easy to enter the gap between the door glass 11 and the inner panel 121, and the first viscoelastic member 13 becomes easy to close the gap between the door glass 11 and the inner panel 121 firmly thereby sealing the automobile interior.

The thickness of the first viscoelastic member 13 is not particularly limited as long as the thickness enables the first viscoelastic member 13 to be constrained between the door glass 11 and the inner panel 121, and can be set appropriately in correspondence with a distance between the door glass 11 and the inner panel 121. Further, a vertical width of the first viscoelastic member 13 is set so that the first viscoelastic member 13 may be constrained in a range where an upper end of the first viscoelastic member 13 reaches a lower end of the inner seal portion 141 at the door glass closed time, thereby to enable a sufficient sound insulating effect.

The first viscoelastic member 13 is provided in a horizontal direction connecting right and left ends in one main surface of the door glass main body 15. A position of the mounting region of the first viscoelastic member 13 in the horizontal direction of the door glass main body 15 is not particularly limited, and the first viscoelastic member 13 may be provided in a manner to extend in the entire in the horizontal direction of the door glass main body 15 or may be provided in a part thereof. When provided in the part of the door glass main body 15, the first viscoelastic member 13 may be continually provided in the part of the door glass main body 15 or may be provided intermittently. Note that since a larger volume of the first viscoelastic member 13 brings about a higher sound insulating effect, the mounting region of the first viscoelastic member 13 is preferable to be provided in the manner to extend in the entire in the horizontal direction of the door glass main body 15.

In the sound insulating structure of the present embodiment, in view of maintaining good drainage of rainwater or the like attached to the automobile exterior side of the door glass 11, the first viscoelastic member 13 is mounted on the lower portion of the main surface on the automobile interior side of the door glass 11. On the other hand, the first viscoelastic member 13 may be mounted on a lower portion of a main surface on a automobile exterior side of the door glass 11, instead of the automobile interior side.

Figure 6:
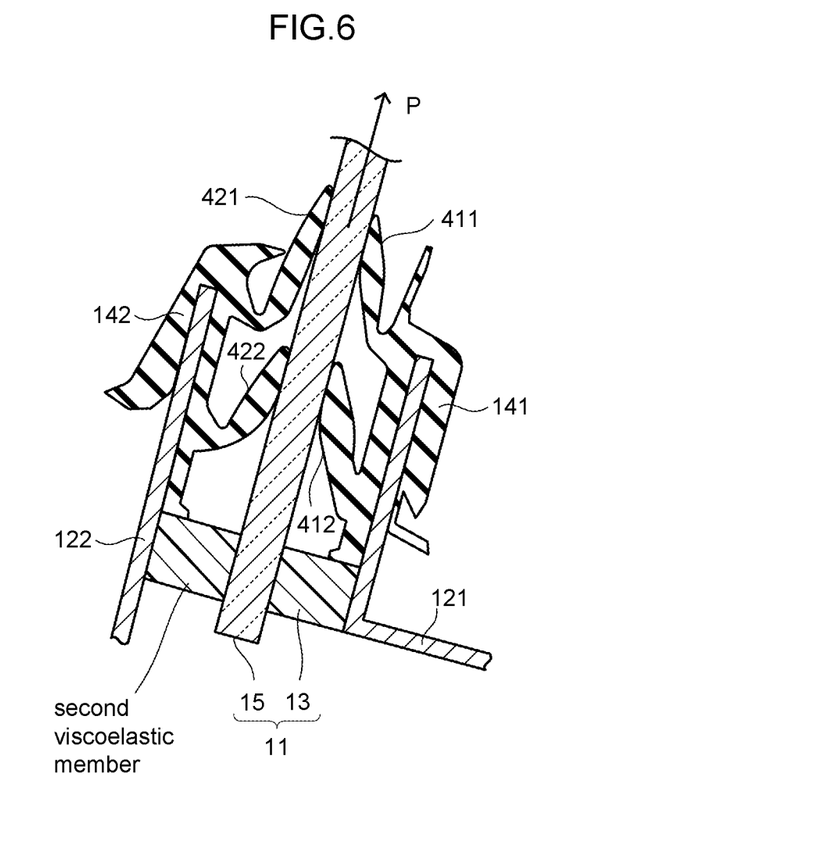
FIG. 6 is an A-A line cross-sectional view of FIG. 1 which schematically shows a state at a door glass closed time in another example of the beltline portion sound insulating structure of the present invention.

Further, in view of increasing the sound insulating effect more, it is preferable to have a first viscoelastic member in a lower portion on an automobile interior side of a door glass 11 and a second viscoelastic member constituted by a viscoelastic material similar to that of the above-described first viscoelastic member in a lower portion of a main surface on an automobile exterior side, as shown in FIG. 6. In other words, it is preferable to have the viscoelastic members in the lower portions on both automobile interior side and automobile exterior side of the door glass 11, respectively. By being mounted on the lower portions of the door glass 11, the first and second viscoelastic members are each constrained by the door glass 11 and a part of a surface of the inner panel 121 or the outer panel 122, at the door glass closed time. Thereby, constraining type vibration suppressing structures are constituted on both surface sides of the door glass 11. Thus, an amount of sound intruding into the automobile interior is sufficiently suppressed and vibration of the door glass main body 15 is sufficiently suppressed, so that a high sound insulating effect in the automobile interior at the door glass closed time can be realized.

[Automobile Door Glass]

Figure 3:
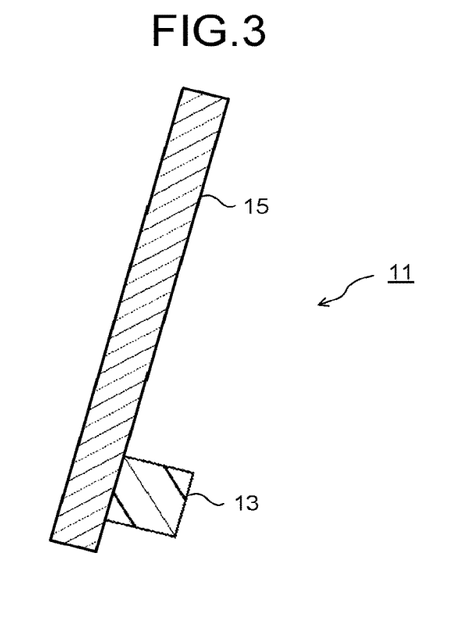
FIG. 3 is a cross-sectional view schematically showing an example of an automobile door glass of the present invention.

FIG. 3 schematically shows the automobile door glass 11 of the present invention. FIG. 3 is a diagram extracting and showing only the automobile glass 11 from the A-A line cross-sectional view of the automobile door glass 11 in the automobile 10 shown in FIG. 1. The automobile door glass 11 shown in FIG. 3 has the door glass main body 15 and the viscoelastic member 13. In FIG. 3, the viscoelastic member 13 is mounted on a portion (lower portion) positioned in a downside at a time that the automobile door glass 11 is provided in the door panel, of at least one main surface of the automobile door glass 11. The automobile door glass 11 is used for the sound insulating structure of the embodiment described above, and constitutes the sound insulating structure in collaboration with the door panel.

The automobile door glass 11 can freely open and close the window opening portion W, as a result of being provided in a liftable manner between the inner panel 121 and the outer panel 122 which constitute the door panel 12 (FIG. 2) of the automobile 10 shown in FIG. 1. At the automobile door glass 11 closed time, the viscoelastic member 13 firmly closes between the door glass 11 and the inner panel 121 thereby sealing the automobile interior. Thus, it is possible to sufficiently suppress the amount of sound intruding into the automobile interior via the beltline portion at the door glass closed time. Further, as a result that the viscoelastic member 13 is constrained between the door glass 11 and the inner panel 121 at the automobile door glass 11 closed time, the constraining type vibration suppressing structure is formed. Thus, when mounted on an automobile, the automobile door glass 11 can constitute the automobile beltline portion sound insulating structure which can achieve the high-level sound insulation state in the automobile interior at the door glass closed time.

(Door Glass Main Body)

The door glass main body 15 is not particularly limited as long as the door glass main body 15 is a transparent plate-shaped body which is normally used for a automobile window. As for its shape, a plate-shaped or curved one can be cited. A shape of the main surface is a shape of a window of a automobile on which the door glass main body 15 is mounted. The plate-shaped body may be a general-purpose flat glass, a tempered glass, a double glazing, a laminated glass or a wire inserted glass. As a quality of material of the plate-shaped body, there can be cited a transparent glass, a resin and so on. A thickness of the plate-shaped body is approximately about 2.8 to 5.0 mm, depending on the kind of the automobile.

As the glass, concretely, there can be cited a normal soda lime glass, a borosilicate glass, a non-alkali glass, a quartz glass and so on. As the glass, it is also possible to use a glass which absorbs ultraviolet ray or infrared ray. Further, as the resin, there can be cited an acryl-based resin such as a polymethyl methacrylate, an aromatic polycarbonate-based resin such as a polyphenylene carbonate, a polystyrene resin, and so on.

(Viscoelastic Member)

A viscoelastic member is the first viscoelastic member 13 described above. The automobile door glass 11 may be constituted to have the viscoelastic member 13 only in one main surface of the door glass main body or constituted to have the viscoelastic members on both main surfaces. The viscoelastic member 13 is bonded to the door glass main body 15, for example by a double-sided adhesive tape, a well-known adhesive agent or the like.

Modification Example 1

Figure 4:
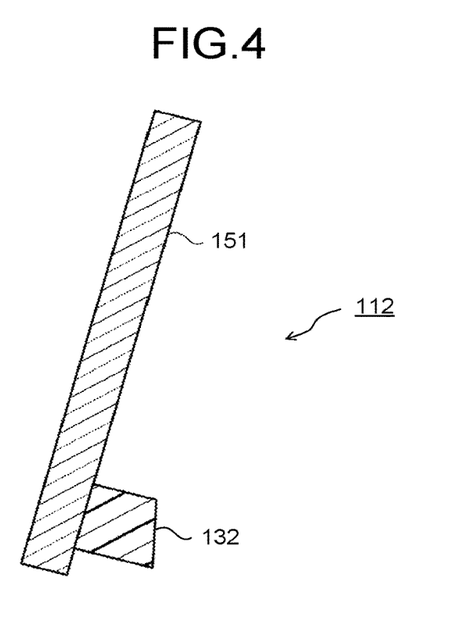
FIG. 4 is a cross-sectional view schematically showing another example of the automobile door glass of the present invention.

FIG. 4 is a cross-sectional view schematically showing an automobile door glass 112 which has a viscoelastic member 132 having a tapered shape. In FIG. 4, with regard to a configuration which exhibits a function similar to that in FIG. 3, redundant explanation will be omitted. The automobile door glass 112 shown in FIG. 4 has a door glass main body 151 and the viscoelastic member 132, and the viscoelastic member 132 is mounted on a lower portion at a time that the door glass 112 is provided in a door panel, of at least one main surface of the automobile door glass 112. The viscoelastic member 132 is constituted by an elastically transformable material. Further, in the viscoelastic member 132, a cross-sectional shape in a vertical cross section in a direction from a door glass 112 side to a automobile interior side at a time that the door glass 112 is mounted on an automobile is a tapered shape that tapers toward its upper end, that is, in a traveling direction of the door glass 112 at a time that the door glass 112 is closed.

The automobile door glass 112 is used for the sound insulating structure of the embodiment described above. As a result that the viscoelastic member 132 is constrained between the door glass 112 and the inner panel 121 at the automobile door glass 112 closed time in a state where the automobile door glass 112 is provided in the door panel, a constraining type vibration suppressing structure is formed. In the automobile door glass 112, since having the tapered shape as described above, the viscoelastic member 132 is easy to enter a gap between the door glass 112 and the inner panel 121 when the door glass 112 is closed from a door glass 112 opened time. Further, since the viscoelastic member 132 is elastically transformed and enters the gap between the door glass 112 and the inner panel 121, the viscoelastic member 132 is easy to close the gap between the door glass 112 and the inner panel 121 thereby sealing the automobile interior. Therefore, when mounted on an automobile, the automobile door glass 112 can constitute an automobile beltline portion sound insulating structure which can achieve a high-level sound insulation state in the automobile interior at a door glass closed time.

Modification Example 2

Figure 5:
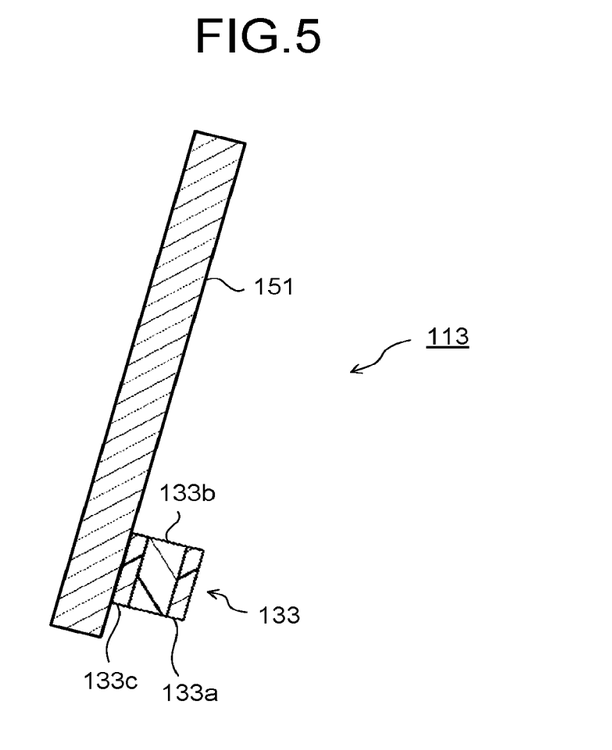
FIG. 5 is a cross-sectional view schematically showing still another example of the automobile door glass of the present invention.

FIG. 5 is a cross-sectional view schematically showing an automobile door glass 113 which has a viscoelastic member 133 made of a laminated structure of three layers. In FIG. 5, with regard to a configuration which exhibits a function similar to that in FIG. 3, redundant explanation will be omitted. The automobile door glass 113 shown in FIG. 5 has a door glass main body 151 and the viscoelastic member 133, and the viscoelastic member 133 is provided in a lower portion at a time that the automobile door glass 113 is provided in a door panel, of at least one main surface of the automobile door glass 113.

The viscoelastic member 133 has, from a automobile interior side when mounted on an automobile toward an automobile door glass 113 side, a most front layer 133a, a soft layer 133b made of a viscoelastic body with a Young's modulus lower than that of the most front layer, and a most front layer 133c with a configuration similar to that of the most front layer 133a. In the viscoelastic member 133, for the most front layers 133a, 133c, there can be used an adhesive material, for example, a foil of aluminum, stainless steel or steel plate steel, a heat-resistant rigid resin, or the like. Further, as a material of the soft layer 133b, there is used a viscoelastic material, i.e., a synthetic rubber such as an EPDM rubber, a thermoplastic elastomer resin such as a polyolefin based elastomer, a polyurethane resin, a polyvinyl chloride resin, an epoxy resin, a silicone gel, a polynorbornene, or the like.

The automobile door glass 113 is used for the sound insulating structure of the embodiment described above. As a result that the viscoelastic member 133 is constrained between the door glass 113 and the inner panel 121 at an automobile door glass 113 closed time, in a state where the automobile door glass 113 is mounted on an automobile, a constraining type vibration suppressing structure is formed. On this occasion, since the most front layer 133a is constituted by the adhesive material as described above, the viscoelastic member 133 adheres to the inner panel 121. Thus, it becomes easy to close a gap between the door glass 112 and the inner panel 121 thereby sealing a automobile interior. Further, since the Young's modulus of the soft layer is in the above-described range, a sufficient vibration suppressing property and sound insulating property are attained. Therefore, when mounted on an automobile, the automobile door glass 113 can constitute an automobile beltline portion sound insulating structure which can achieve a high-level sound insulation state in an automobile interior at a door glass closed time.

Hereinabove, according to the automobile beltline portion sound insulating structure of the embodiment, as a result that intrusion of sound from between the door panel and the door glass is hampered and occurrence of sound due to vibration of the door glass itself is prevented, an excellent sound insulating effect can be exhibited. Further, according to the automobile door glass with the viscoelastic member of the embodiment, since the automobile door glass constitutes the above-described beltline portion sound insulating structure when mounted on an automobile, an excellent sound insulating effect is exhibited.

What is claimed is:

1. An automobile beltline portion sound insulating structure formed along a beltline of an automobile, comprising:
    a door panel having an inner panel and an outer panel as two panel boards facing each other,
    a door glass main body freely openable and closable between the two panel boards in a liftable manner, and
    a first viscoelastic member mounted on a lower portion of at least one main surface of the door glass main body and constrained between a mounting region of the first viscoelastic member in the door glass main body and a part of a surface of the inner panel facing to the at least one main surface, at a door glass closed time, to insulate sound,
    wherein
    the first viscoelastic member comprises a foamed viscoelastic material,
    the first viscoelastic member is elastically transformable and a thickness of the first viscoelastic member is decreased at the door glass closed time compared with a door glass opened time, and
    the first viscoelastic member has a Young's modulus E in N/m² at 20° C. and a loss coefficient tan δ at 20° C. and 4000 Hz satisfying formula (2):

$$E \geq 1.65 \times 10^5 \frac{1 + \tan^2 \delta}{\tan \delta}. \quad (2)$$

2. The automobile beltline portion sound insulating structure according to claim 1, wherein the first viscoelastic member has a laminated structure comprising a soft layer whose Young's modulus at 20° C. is lower than that of another layer.

3. The automobile beltline portion sound insulating structure according to claim 1, wherein a cross-sectional shape in a vertical cross section in a direction from a door glass side to an automobile interior side of the first viscoelastic member is a tapered shape that tapers toward its upper end.

4. The automobile beltline portion sound insulating structure according to claim 1, wherein
    the at least one main surface of the door glass main body is a main surface on the automobile interior side; and
    the first viscoelastic member is constrained between the mounting region of the first viscoelastic member in the door glass main body and the part of the surface of the inner panel facing to the door glass main body, at the door glass closed time.

5. The automobile beltline portion sound insulating structure according to claim 1, further comprising
    a second viscoelastic member mounted on a lower portion of the other main surface of the door glass main body,
    wherein the second viscoelastic member is constrained between a mounting region of the second viscoelastic member in the door glass main body and a part of a surface on a door glass side of the outer panel facing the other main surface, at the door glass closed time.

6. The automobile beltline portion sound insulating structure according to claim 5, wherein the second viscoelastic member is elastically transformable and a thickness of the second viscoelastic member is decreased at the door glass closed time compared with a door glass opened time.

7. The automobile beltline portion sound insulating structure according to claim 1, wherein the mounting region of the first viscoelastic member extends in an entire horizontal direction of the door glass main body.

8. The automobile beltline portion sound insulating structure according to claim 1, wherein the first viscoelastic member has a layer which contacts the inner panel and has adhesiveness to the inner panel.

9. An automobile door glass for a sound insulation structure formed along an automobile beltline and comprising a door panel having an inner panel and an outer panel as two panel boards facing each other, the automobile door glass comprising:
- a door glass main body freely openable and closable between the two panel boards in a liftable manner, and
- a first viscoelastic member mounted on a lower portion of at least one main surface of the door glass main body and constrained between a mounting region of the first viscoelastic member in the door glass main body and a part of a surface of the inner panel facing to the at least one main surface, at a door glass closed time, to insulate sound, wherein
the first viscoelastic member comprises a foamed viscoelastic material,
the first viscoelastic member is elastically transformable and a thickness of the first viscoelastic member is decreased at the door glass closed time compared with a door glass opened time, and
the first viscoelastic member has a Young's modulus E in N/m² at 20° C. and a loss coefficient tan δ at 20° C. and 4000 Hz satisfying formula (2):

$$E \geq 1.65 \times 10^5 \frac{1 + \tan^2 \delta}{\tan \delta}. \quad (2)$$

10. The automobile door glass according to claim 9, wherein the first viscoelastic member has a laminated structure comprising a soft layer whose Young's modulus at 20° C. is lower than that of another layer.

11. The automobile door glass according to claim 9, wherein a cross-sectional shape in a vertical cross section in a direction from a door glass side to an automobile interior side of the first viscoelastic member is a tapered shape that tapers toward its upper end.

12. The automobile door glass according to claim 9, further comprising
a second viscoelastic member mounted on a lower portion of the other main surface of the door glass main body,
wherein the second viscoelastic member is constrained between a mounting region of the second viscoelastic member in the door glass main body and a part of a surface on a door glass side of the outer panel facing the other main surface, at the door glass closed time.

13. The automobile door glass according to claim 9, wherein the mounting region of the first viscoelastic member extends in an entire horizontal direction of the door glass main body.

14. The automobile door glass according to claim 9, wherein the first viscoelastic member has a layer which contacts the inner panel and has adhesiveness to the inner panel.

* * * * *